Nov. 13, 1962 W. ROESLER 3,063,476
APPARATUS FOR THE MANUFACTURE OF ELECTRICALLY WELDED WIRE NETS
Original Filed Feb. 4, 1952 6 Sheets-Sheet 1

Inventor:
WALTER ROESLER
By Joseph Hirschman
ATTORNEY

Inventor:
WALTER ROESLER

Nov. 13, 1962 W. ROESLER 3,063,476
APPARATUS FOR THE MANUFACTURE OF ELECTRICALLY WELDED WIRE NETS
Original Filed Feb. 4, 1952 6 Sheets-Sheet 5

Inventor:
WALTER ROESLER
By Joseph Hirschmann
ATTORNEY

Nov. 13, 1962 W. ROESLER 3,063,476
APPARATUS FOR THE MANUFACTURE OF ELECTRICALLY WELDED WIRE NETS
Original Filed Feb. 4, 1952 6 Sheets-Sheet 6

Inventor:
WALTER ROESLER
By
ATTORNEY

United States Patent Office 3,063,476
Patented Nov. 13, 1962

3,063,476
APPARATUS FOR THE MANUFACTURE OF
ELECTRICALLY WELDED WIRE NETS
Walter Roesler, Opmunderweg 14, Soest, Germany
Original application Feb. 4, 1952, Ser. No. 269,800, now
Patent No. 2,813,552, dated Nov. 19, 1957. Divided
and this application Feb. 16, 1956, Ser. No. 569,667
Claims priority, application Germany Feb. 7, 1951
9 Claims. (Cl. 140—112)

The present invention relates to apparatus for feeding the cross wire in a machine for the manufacture of electrically welded wire nets from longitudinal and cross wires, in particular for wire nets of large width.

This application is a division of my co-pending application Serial No. 269,800, filed February 4, 1952 and now Patent No. 2,813,552.

Previously, electrically welded wire nets have been manufactured from longitudinal and cross wires in such a manner that the wire used for the cross wire was pulled from wire coils mounted on rotating carrier disks, by grippers mounted on similar disks and laying the wires between the electrodes on or below the longitudinal wires. This step was carried out in such manner that by the rotation of the disks the coils and grippers arranged thereon approached each other to such an extent that the gripper became capable of clamping the cross wire. Subsequently, by the continued movement of the disks, the cross wire was pulled from the supply coils and laid under initial tension between the electrodes. Thereafter the wire introduced between the electrodes was cut off before, during, or after the welding operation.

It is also known to lay the cross wire under initial tension directly between the electrodes by means of a lever system which moves back and forth before or behind the electrodes and pulls the cross wire from a supply reel or a coil.

The disadvantages of these known methods and devices reside above all in the fact that the means for feeding the cross wire are of complicated construction and liable to be deranged. Even if the width of the net is only of moderately large dimension such machines must acquire dimensions which make their economy questionable and their performance is adversely affected by centrifugal forces. Nets of rather large widths cannot be made at all by levers for stringing the cross wires.

It is the object of the invention to remove these disadvantages and to enable the manufacture of very wide wire nets of the type described. In accordance with the invention it is proposed to introduce the cross wire above or below the longitudinal wires by means of a wire guide reciprocated on a straight or curved path, and thereafter to weld the cross wire to the longitudinal wires after the former has been introduced. This may be carried out in such a manner that the cross wire is fed to the wire guide continuously from a wire supply, reel, coil, or the like, and is pulled from the supply, reel, or the like by the reciprocating motion of the wire guide, and that after the pick the cross wire is laid in the range of the electrodes by means of special feed members; moreover, in other embodiments of this invention, the cross wire is land directly into the range of the electrodes and that the direct introduction of the cross wire into the range of the electrodes may be performed with a wire guide which moves along a straight path and is provided for this purpose with a wire guide casing, or that this aim is accomplished with a wire guide moving along a curved path.

Devices for carrying out these methods of operation are characterized by the feature that the wire guide, being preferably shot to and fro by beaters, is provided with at least two guide rolls between which passes the cross wire pulled from the reel or the like. The device may have feed fingers, which move the cross wire forwardly against loop holders and lay it there under initial tension between the electrodes. Moreover, feed fingers arranged on both sides of the wire net may be subjected alternately to an up-and down motion, and to a back-and-forth motion staggered therefrom, e.g., by 90 deg. In this case the upward movement, which may be controlled by a cam, brings the finger behind the cross wire, which has been laid by the wire guide approximately transversely to the longitudinal direction of the wire net, whereas the forward movement of the finger, which may be controlled during such upward movement by, for example, a stop, causes the finger to press the cross wires before the loop holders arranged adjacent to the electrodes.

By the teaching of the invention it is accomplished, above all, that welded wire nets of any desired widths, even of the largest widths, may be made by means of a machine which occupies only small space compared with the width of the work.

In the accompanying drawings the invention is illustrated by way of example in several embodiments, FIG. 1 is a front elevation of the machine, partly vertical section along line I—I of FIG. 2, and shows a first embodiment of the machine.

FIG. 9 is a side elevation of the machine shown in FIG. 2 in the scale of said FIG. 2.

Figure 1:
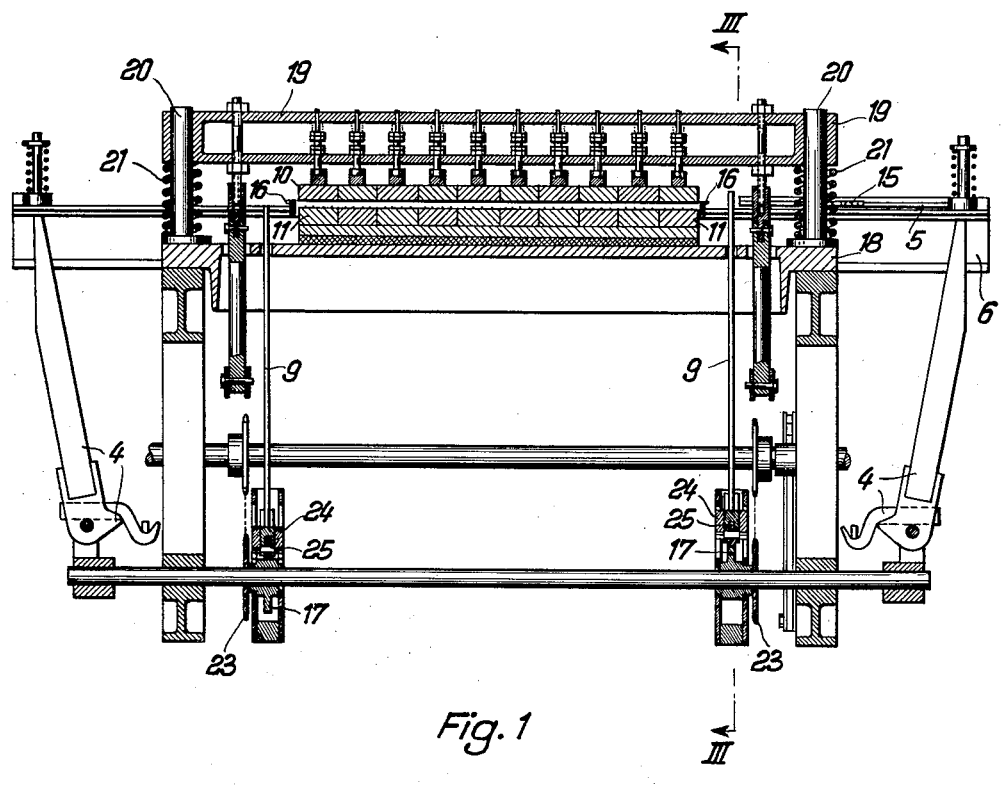
Figure 2:
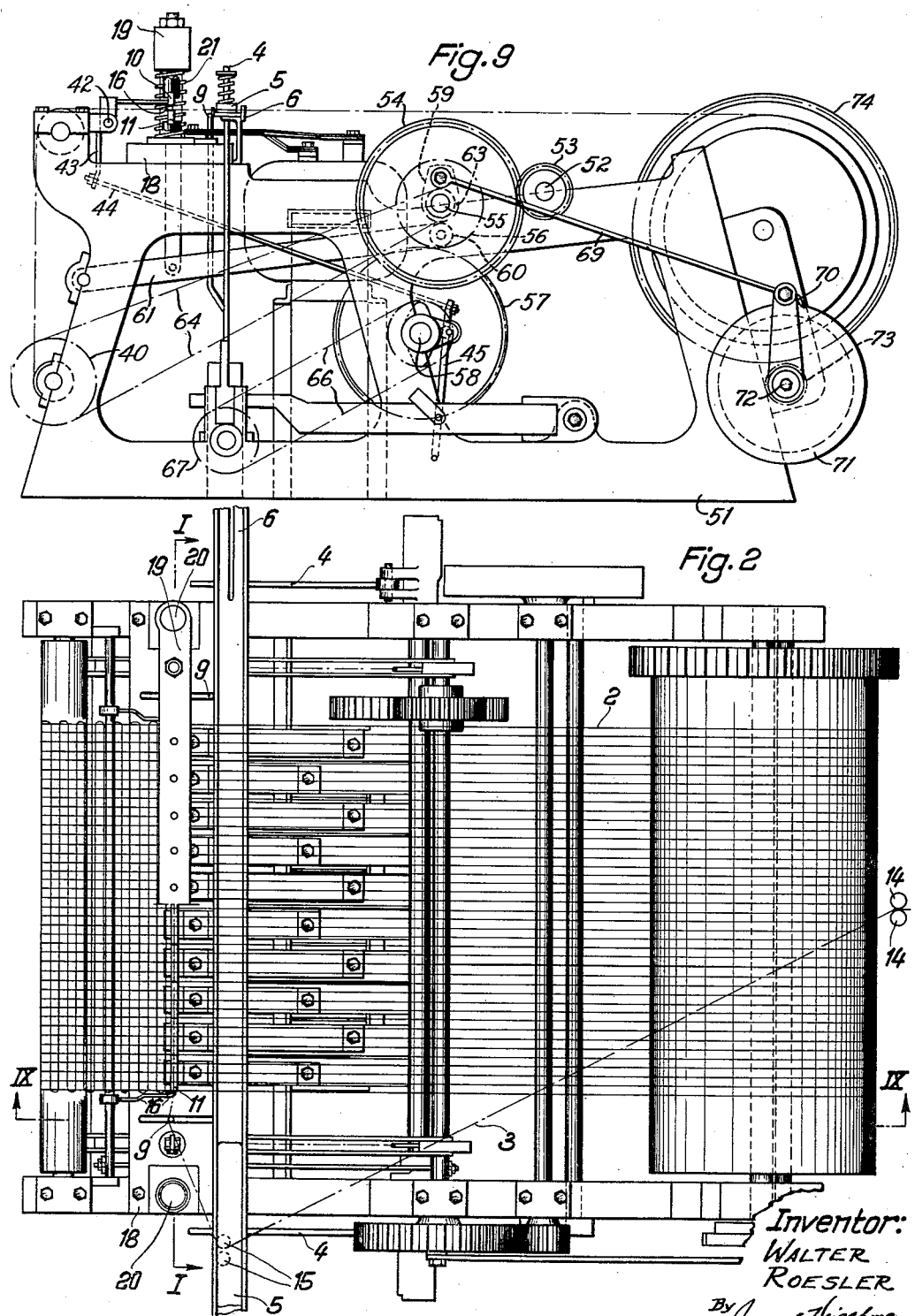
FIG. 2 is a top plan view of the machine shown in FIG. 1, the electrodes which lie above the wire net being omitted.

In accordance with the invention, electrically welded wire nets 1 are manufactured from longitudinal wires 2 and cross wires 3 in such a manner that by means of a wire guide 5 moved by means of beating members, consisting of beaters 4, along a straight raceway 6 or an arcuate raceway 7 (FIG. 6), the cross wire 3 is shot above or below the longitudinal wires 2. The cross wire 3 may be taken from a coil arranged in the shuttle 5. It is preferable, however, to feed the cross wire 3 to the wire guide 5 continuously from a reel 8 (FIG. 6), coil, or the like, and to pull the cross wire from the reel 8 (FIG. 6) or the like by the reciprocating motion of the wire guide 5. After the pick the cross wire 3 is shifted into the range of the electrodes 10, 11 by means of special alternately acting feed members 9. It is also possible, however, to shoot the cross wire directly into the range of the electrodes 10, 11. This direct picking of the cross wire 3 may be effected with a wire guide 5 moving along a straight raceway 6 and provided with a projecting wire guide housing 12 (FIG. 5), or with a wire guide 13, (FIG. 6) moving along an arcuate raceway 7, in which case the feed fingers 9 are dispensed with. In accordance with FIGS. 1 to 3 and 9 the manufacture of the wire net 1 proceeds as follows:

Wound on a reel 8 (FIG. 6), the cross wire 3 is guided between two guide rollers 14 and is strung or thrown transversely the longitudinally wires 2 by means of the wire guide 5, which carries two wire guide rollers 15 and is thrown back and forth by the beaters 4 on the straight raceway 6. The cross wire is caught by loop holders 16 and laid at an angle before the electrodes 10 and 11. That one of the alternately operated feed fingers 9 which is at the side of the machine at which the wire guide has arrived, then moves (rises) into position behind the thus strung cross wire 3, which is under initial tension, and forces the cross wire against the loop holders 16 to lay it between the electrodes 10 and 11. The arrangement of the loop holders 16 is such that their front edges are in alignment with the center of the electrodes 10, 11 to provide for the correct welding position of the cross wire 3, which is pressed against the loop holders 16 by the fingers 9. Moreover, the loop holders 16 have the function of taking up the jerk caused by the sudden pulling of the wire 3 from the supply reel to prevent a sudden contraction of the net 1.

Being arranged on both sides of the wire net 1, the feed fingers 9 are subjected alternately to an up-and-down motion, and to a forward-and-backward motion staggered therefrom, e.g., by 90 deg. Driven by a gear 23, a cam 17 (in FIG. 8 a double or triple cam 17') lifts a roll 25 sliding in a guide 24. Thereby the feed finger 9, fixed to the roll mounting 26, is moved behind the prestressed cross wire 3. As the upward movement of the roll 25 continues, a nose 27 strikes against a stop 28 whereby the rotatably arranged roll mounting 26 together with the finger 9 is tilted forwardly. At the same time the feed finger 9 pulls the cross wire 3 before one of the two loop holders 16 and between the electrodes 10 and 11. After the two electrodes have been forced together, the welding is effected. During the welding, the cam 17 releases the feed finger 9, which now oscillates back to its initial position. During the welding, means 39 stop the pull-off motion of the wire net 1, e.g., by blocking the friction drive 40 of product beam 41, adapted to receive and to pull off the finished net or nets.

The lower electrode 11 is mounted on a welding table 18. The upper electrode 10 moves resiliently with the welding bridge 19. The latter is held on two guide columns 20 by means of two compression springs 21 to provide for the electrode spacing, which is adjustable. After the cross wire 3 has been laid between the electrodes 10 and 11 the upper bridge 19 is moved vertically by rods 20a, whereby the electrodes 10 and 11 are pressed one toward the other with the crossed wires between them. The longitudinal and cross wires lying between the electrodes are welded by the operation of a switch controlled by the machine. When the bridge 19 has been lifted by the said eccentric, and the loop holders have been lifted at the same time, the welded wire net has been released. It is advanced by a winding device in accordance with the set mesh aperture.

Figure 4:
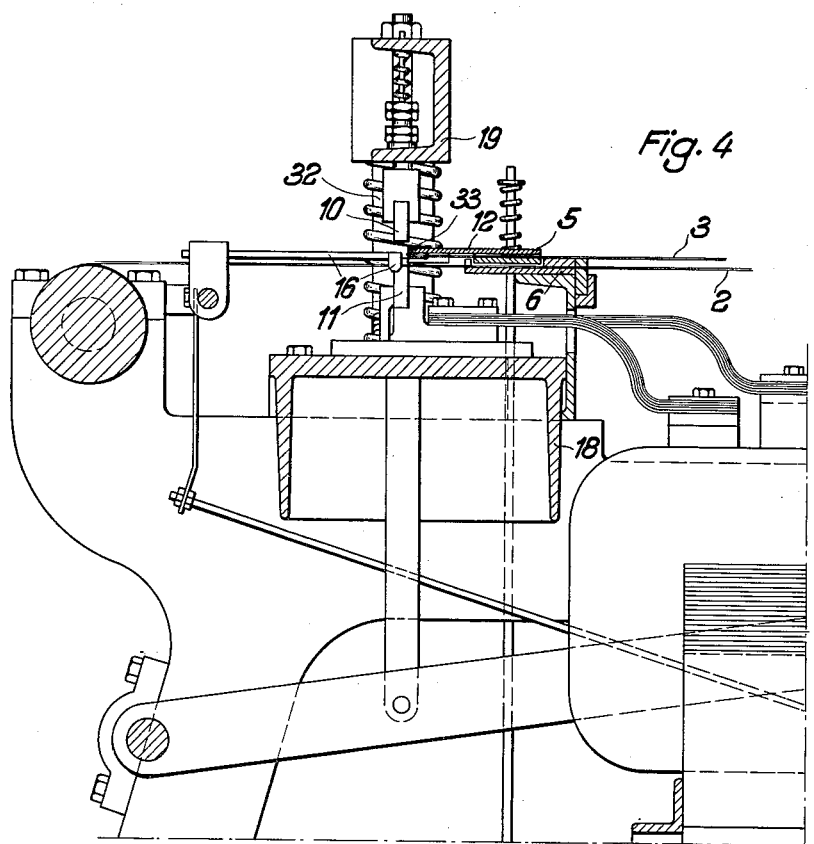
FIGS. 4 and 5 are a vertical cross-sectional and a top plan view, respectively, showing another embodiment of the machine, in which the wire guide is also moved along a straight path but the cross wire is shot directly between the electrodes.
Figure 5:
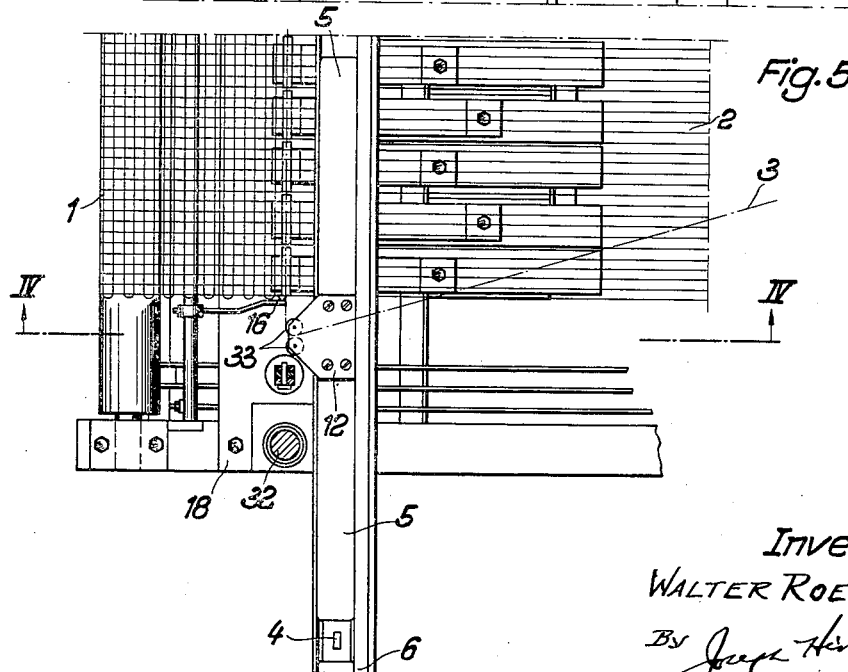

FIGS. 4 and 5 show an embodiment for the direct introduction of the cross wire 3 between the electrodes 10 and 11. To this end the wire guide 5 is provided with a projecting feed member 12, which carries wire guide rolls 33. The straight raceway 6 is arranged more closely to the electrodes 10 and 11 while four guide columns 32, to receive the bridge 19, are mounted on the lower welding table 18. As the wire guide 5 moves back and forth, the cross wire 3 is laid before the loop holders 16 and is thus laid directly between the electrodes 10 and 11.

Figure 6:
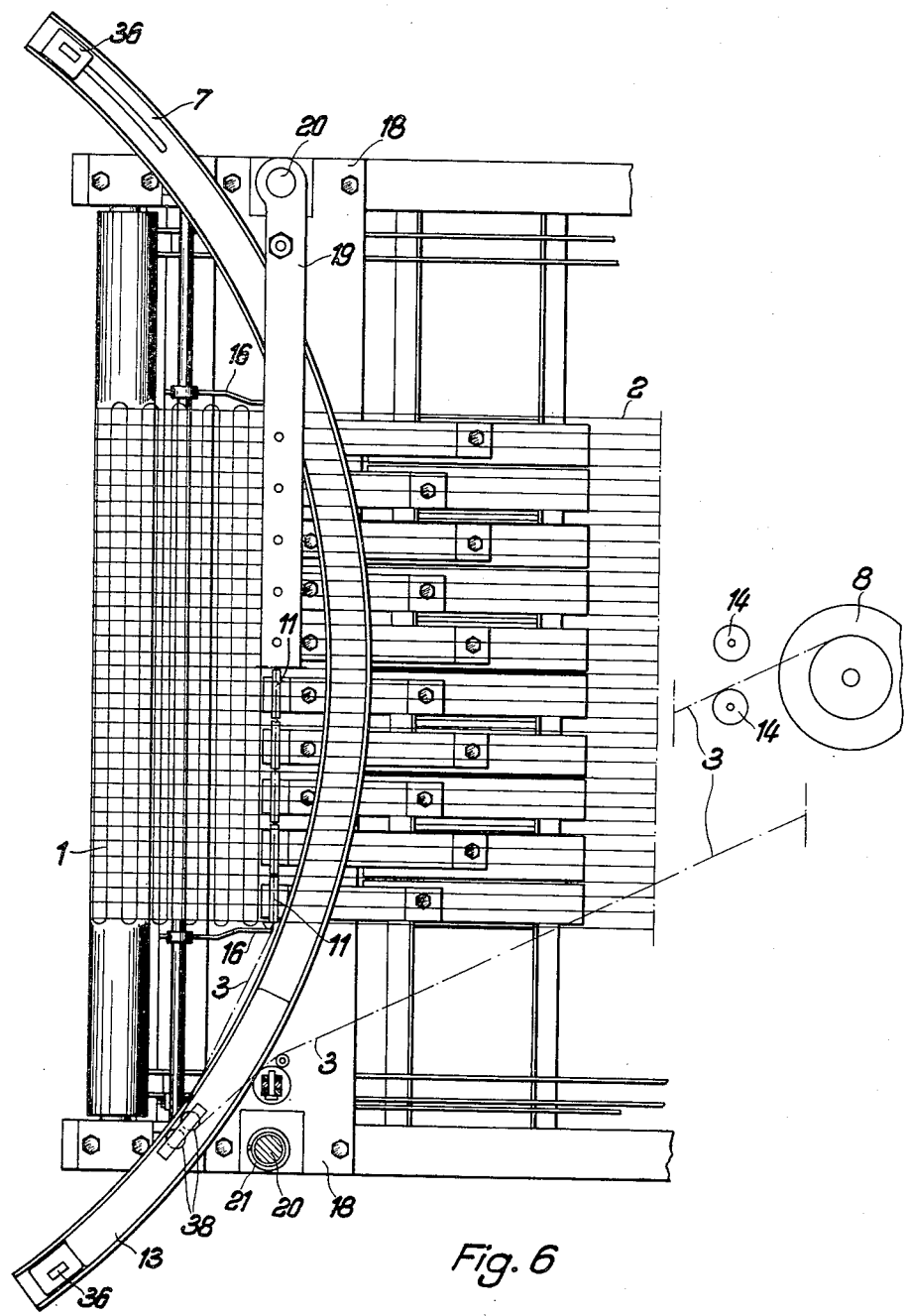
FIG. 6 is a top plan view of a different embodiment of a machine, in which the wire guide is moved along an arcuate path and the cross wire is shot directly between the electrodes.

FIG. 6 shows an example for the direct introduction of the cross wire 3 between the electrodes 10 and 11 by means of a wire guide 13 moved along an arcuate raceway 7. Being moved back and forth on this arcuate raceway 7 by the beaters 36, the wire guide 13 lays the cross wire 3 directly before the loop holders 16 and thus lays it between the electrodes 10 and 11. Pulled from the reel 8, the cross wire 3 is moved in the wire guide 13 by means of the rolls 38 attached thereto. The construction of the welding table 18 and of the welding bridge 19, and the operation of the latter, correspond to the welding device described hereinbefore.

Figure 8:
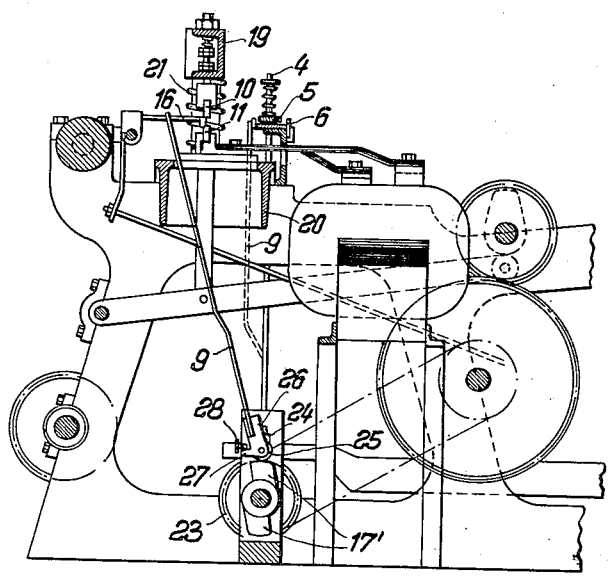
FIG. 8 is a side elevation of the machine shown in FIG. 7.
Figure 7:
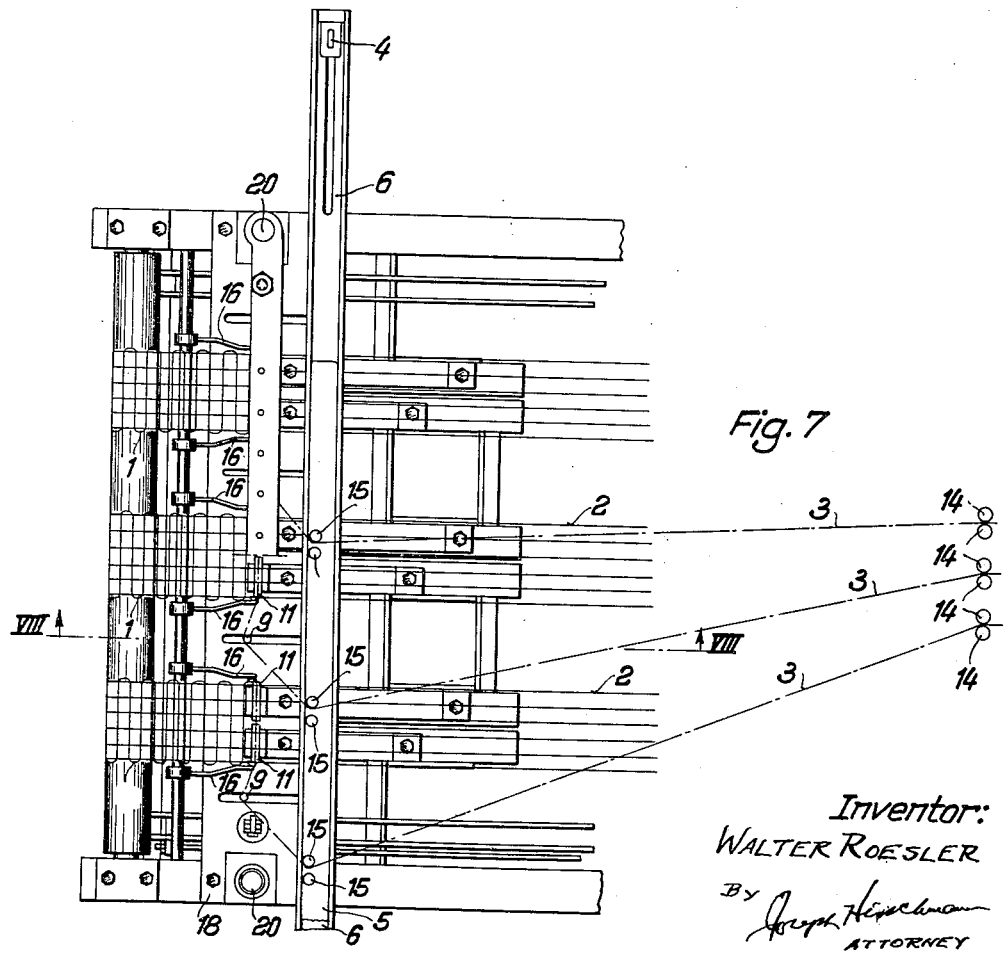
FIG. 7 is a top plan view of a welding stand serving for the simultaneous manufacture of several welded wire nets.

FIGS. 7 and 8 show an embodiment of the welding stand as used where several welding nets are to be manufactured at the same time. FIGS. 7 and 8 are based on the principle of operation illustrated in FIGS. 1 to 3 and 9. Similarly the welding stand shown in FIGS. 7 and 8 might be based also on the method of operation shown in FIG. 5.

In FIGS. 7 and 8, numerals 1 designate a number of wire nets welded at the crossings and manufactured jointly in a single operation. To this end a number of sets of longitudinal wires are provided, each set serving for the manufacture of one net 1. For this purpose the longitudinal wires 2 are wound on a common warp beam (which may be replaced, of course, by several warp beams). Numerals 3 designate the cross wires required in addition to the longitudinal wires to manufacture the wire nets. In this embodiment these cross wires are wound on a common reel 8 (FIG. 6), which may of course be replaced by several reels. Neither is it necessary that the cross wires are wound on a reel each, as they may also be taken from a single cross wire supply. All sets of longitudinal wires 2 have associated therewith a common wire guide race 6, on the straight raceway of which the common wire guide 5 is guided. The common wire guide might be replaced by several, preferably intercoupled wire guides. The common wire guide, however, has the advantage that it need be reciprocated only with an amplitude the size of which corresponds to the width of a single net 1. This leads to a comparatively small travel of the wire guide 5, with a corresponding possible increase of the working cycle of the machine. The shuttle 5 has arranged thereon pairs of guide rolls 15, spaced by fixed equal distances. The several cross wires 3 are fed to the guide rolls 15 from the reel 8. The other ends of the cross wires are laid in zig-zag pattern each, by means of the wire guide 5 and the pairs of rolls 15, so that the nets 1 are formed. The point where the welding electrodes are arranged, in accordance with the embodiment shown in FIGS. 1 to 3 and 9, being spaced from the raceway 6 for the shuttle 5, the cross wire running off the pairs of rolls 15 must be moved into its welding position by special means. This is effected again by feed members 9, constructed as shown in FIGS. 1 to 3 and 9 so that they have a corresponding control. This control imparts to the feed members 9, in addition to a rising and falling motion, another reciprocating motion in the direction of the longitudinal wires 2, to span the space between the welding electrodes and the raceway. The feed members 9 thus lay the cross wire 3 provided for each wire net 1 before the loop holders 16, to lay it under tension between the welding electrodes 10 and 11, which are shown in FIG. 8. The welding electrodes weld the portion of cross wire which has been laid and shifted into welding position to the corresponding longitudinal wires 2, so that a wire net 1 is formed all over each set of longitudinal wires 2. The motion of the wire guide 5 is effected again with a beating mechanism 4, which may be replaced by any other motion drive.

The mechanism for effecting the various movements above described has been only briefly referred to in the foregoing, and will now be described in greater detail, reference being had particularly to FIGS. 3 and 9.

Figure 3:
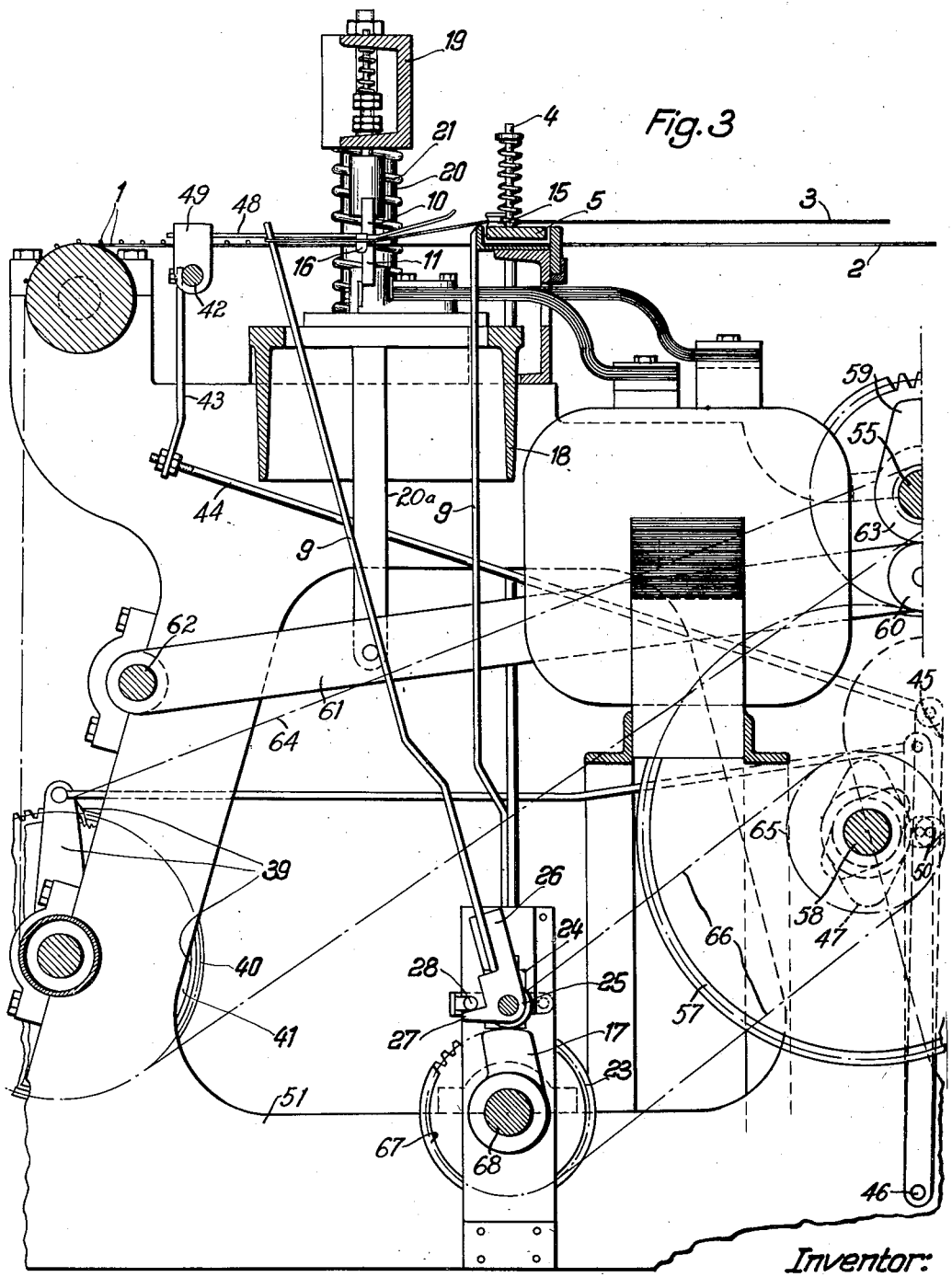
FIG. 3 is an enlarged side elevation of the machine with a partial section along line III—III of FIG. 1, to illustrate especially the operation of the feed fingers.

As shown in FIG. 3, the loop holders 16 consist of flat metallic members whose lower edges are rounded off, and which are secured to a short rod 48. The rod 48 is clamped in the member 49. The members 49 are movable longitudinally along the shaft 42 but rotate therewith. The shaft is journaled at both its ends in the machine frame. One of the members 49 is controlled by a rod 43 to which is secured a rod 44. The latter is pivotally connected to the lever 45 whose other end is journaled at 46. The lever 45 carries a roller 50 which engages the cam 47, and as the cam rotates, it moves the lever in clockwise direction about the pivot 46. Thereby the member 49, and with it the shaft 42, together with the other member 49 at the opposite side of the machine, are rotated counter-clockwise about the axis of shaft 42, so that the loop holders 16 are lifted out of the loops of the net formed by them. Under the action of the just-described operating mechanism, the loop holders 16 again assume the position shown in FIG. 3 as soon as a new cross wire is laid by the wire guide 5.

As shown in FIG. 9, the machine frame 51 is equipped with a main drive shaft shown at 52. The driving pinion 53 on the shaft meshes with the gear 54 which drives the shaft 55. Fixed to the shaft 55 is a gear 56 which drives the gear 57 rigid with the shaft 58. On shaft 58 is secured the already-mentioned cam 47 (FIG. 3). The cams 59 are fixed to the shaft 55, and cooperating with these cams are the rollers 60 at the ends of levers 61 which are pivotally mounted in the machine frame 51 at 62. Pivoted to the levers 61 are the rods 20a which are connected to the upper electrode bridge 19, so that such bridge performs an up-and-down movement in dependence on the rotation of the cams 59.

FIG. 9 shows further that the shaft 55 drives a sprocket 40 by means of a sprocket 63 rotating with the shaft and a sprocket chain 64. The shaft 58, on the other hand, serves to drive the sprocket 67 by means of a sprocket wheel 65 rotating with it and sprocket chain 66, and thereby drives the shaft 68 on which the cam 17 is fixed (see also FIG. 3) which, by way of the member 26 and with the stop 28, serves for actuating the feed fingers 9.

Finally, as shown in FIG. 9, there is pivoted to the cam 59 the rod 69 which, by way of the ratchet 70 and ratchet wheel 71, drives intermittently the shaft 72 on which is arranged the gear 73 meshing with a gear 74 which in turn serves for driving the drum from which the longitudinal wires 2 are drawn off. By deriving all of the described control movement from the main shaft 52, there result, from the illustrated kinematic interconnections, the desired control movements at the required instants and time intervals. The same applies to the drive of the beater 4 in FIG. 1, which is derived from the main shaft 52 in the manner known in looms.

I claim:

1. A machine for the manufacture of wire nets of longitudinal and cross wires intersecting at right angles and welded at the crossings, comprising, in combination, a frame, a warp beam for supplying the longitudinal wires, a product beam adapted to pull off and receive the finished wire nets, means for rotating the product beam, at least one cross wire supply, a race extending transversely to the longitudinal wires, at least one wire guide reciprocable in said race to throw the cross wire transversely to the longitudinal wires from opposite directions, a beater at each end of the race and alternatingly actuated for reciprocating the wire guide, said wire guide being adapted to throw the transverse wire freely in space under the influence of the momentum of the guide and back and forth across the longitudinal wires, a welding station at which the cross and longitudinal wires are welded to each other, a loop holder at each side of the welding station movable substantially perpendicularly to the plane of the longitudinal wires at said welding station, said loop holders being adapted to orient the transverse wire in the welding position and to absorb the tug occurring in the transverse wire as it is reversed, welding electrodes arranged on both sides of the longitudinal wires at said welding station, and means for effecting the periodical operation of the welding electrodes.

2. A machine as defined in claim 1, wherein the wire guide race is constructed to form a straight path for the wire guide, the wire guide being provided with wire engaging means projecting beyond the body of the wire guide over the race and toward the electrodes, whereby said wire guide acts to dispose the cross wire between and in alignment with the electrodes.

3. A machine as defined in claim 1, wherein the wire guide race is of arcuate shape, the arc being concave toward the finished net, whereby the wire guide first throws the cross wire obliquely to the longitudinal wires and then swings the wire, anchored at the opposite end at a loop holder, into alignment with the welding electrodes.

4. A machine for the simultaneous manufacture of a plurality of wire nets of longitudinal and cross wires intersecting at right angles and welded at the crossings, comprising, in combination, a frame, a warp beam for supplying the longitudinal wires, a product beam adapted to pull off and receive the finished wire nets, means for rotating the product beam, a plurality of cross wire supplies, a race extending transversely to the longitudinal wires, a wire guide having a plurality of guide roll arrangements for drawing off wires from said supplies, and reciprocable in said race to throw simultaneously a plurality of cross wires transversely to the longitudinal wires, a beater at each end of the race and alternatingly actuated for reciprocating the wire guide, said wire guide being adapted to throw the transverse wires freely in space under the influence of the momentum of the guide and back and forth across the longitudinal wires, a welding station at which the plurality of cross and plurality of sets of longitudinal wires are welded to each other simultaneously, loop holders at opposite sides of each set of longitudinal wires and movable toward and away from the plane of the respective net and operating to orient the cross wires in the welding position and to absorb the tug occurring in the transverse wire as it is reversed, a single set of welding electrodes arranged on both sides of the longitudinal wires at said welding station, and means for effecting the periodical operation of the welding electrodes.

5. A machine for the manufacture of wire nets of longitudinal and cross wires intersecting at right angles and welded at their crossings, comprising, in combination, a frame, welding electrodes supported on the frame, a supply for longitudinal wires and a supply for a cross wire, a wire guide for throwing the cross wire freely in space across the longitudinal wires alternatingly from opposite sides of the machine, beater mechanism at opposite sides of the machine for propelling the wire guide across the longitudinal wires, means for orienting the cross wire with the electrodes, and at right angles to the longitudinal wires, means for operating the welding electrodes to effect welding of a cross wire to the longitudinal wires before the next adjacent cross wire run is thrown, and means for moving the longitudinal wires a distance corresponding to the width of a wire mesh between successive welding operations.

6. A machine for the manufacture of wire nets of longitudinal and cross wires intersecting at right angles and welded at their crossings, comprising, in combination, a frame, welding electrodes supported on the frame, a supply for longitudinal wires and a supply for a cross wire, a wire guide for throwing the cross wire freely in space and obliquely across the longitudinal wires alternatingly from opposite sides of the machine, beater mechanism at opposite sides of the machine for propelling the wire guide across the longitudinal wires, means for aligning each so-formed cross run in succession with the welding electrodes and at right angles to the longitudinal wires, means for operating the welding electrodes to effect welding of an aligned cross wire to the longitudinal wires before the next adjacent cross wire run is thrown, and means for moving the longitudinal wires a distance corresponding to the width of a wire mesh between successive welding operations.

7. A machine as defined in claim 1, including means operative on the product beam to interrupt the pull off motion of the wire net during the welding.

8. A machine for the manufacture of wire nets of longitudinal and cross wires intersecting at right angles and welded at the crossings, comprising, in combination, a frame, a warp beam for supplying the longitudinal wires, a product beam adapted to pull off and receive the finished wire net, means for rotating the product beam, at least one cross wire supply, a race extending transversely to the longitudinal wires, at least one wire guide reciprocable in said race to throw the cross wire transversely to the longitudinal wires from opposite directions, a beater at each end of the race and alternatingly actuated for reciprocating the wire guide, said wire guide being adapted to throw the transverse wire freely in space under the influence of the momentum of the guide and back and forth across the longitudinal wires, a welding station at which the cross and longitudinal wires are welded to each other, loop holders at opposite sides of the machine and movable transversely to the plane of the net, said loop holders being adapted to orient the transverse wires in the welding position and to absorb the tug occurring in the transverse wire as it is reversed, welding electrodes arranged on both sides of the longitudinal wires at said welding station, means for effecting the periodical operation of the welding electrodes, said welding electrodes being spaced from the wire guide race longitudinally of the net, the cross wire being laid obliquely to the welding electrodes, and including feed members movable to engage the oblique cross wire extending from the wire guide and shift it into alignment with the electrodes, said loop holders acting alternatingly to anchor a cross wire at the welding station as the opposite end of the wire is swung by a feed member in tensed condition to the welding station.

9. A machine for the manufacture of wire nets of longitudinal and cross wires intersecting at right angles and welded at the crossings, comprisings, in combination, a frame, a warp beam for supplying the longitudinal wires, a product beam adapted to pull off and receive the finished wire net, means for rotating the product beam, at least one cross wire supply, a race extending transversely to the longitudinal wires, at least one wire guide reciprocable in said race to throw the cross wire transversely to the longitudinal wires from opposite directions, a beater at each end of the race and alternatingly actuated for reciprocating the wire guide, said wire guide being adapted to throw the transverse wire freely in space under the influence of the momentum of the guide and back and forth across the longitudinal wires, a welding station at which the cross and longitudinal wires are welded to each other, loop holders at opposite sides of the machine and movable transversely to the plane of the net, said loop holders being adapted to orient the transverse wires in the welding position and to absorb the tug occurring in the transverse wire as it is reversed, welding electrodes arranged on both sides of the longitudinal wires at said welding station, means for effecting the periodical operation of the welding electrodes, said welding electrodes being spaced from the wire guide race longitudinally of the net, the cross wire being laid obliquely to the welding electrodes, and including feed members movable to engage the oblique cross wire extending from the wire guide and shift it into alignment with the electrodes, said loop holders acting alternatingly to anchor a cross wire at the welding station as the opposite end of the wire is swung by a feed member in tensed condition to the welding station, and operating means for the feed members acting to lift and lower said members transversely to the plane of the finished net and to reciprocate them in the direction of the longitudinal wires.

References Cited in the file of this patent

UNITED STATES PATENTS

| | | |
|---|---|---|
| 1,922,270 | Southwell | Aug. 15, 1933 |
| 1,922,271 | Southwell | Aug. 15, 1933 |
| 1,961,991 | Southwell | June 5, 1934 |